(12) United States Patent
Ahmadshahi

(10) Patent No.: US 10,111,481 B2
(45) Date of Patent: Oct. 30, 2018

(54) SIGNAL-ACTIVATED LINGERIE

(71) Applicant: Michael Mansour Ahmadshahi, Laguna Niguel, CA (US)

(72) Inventor: Michael Mansour Ahmadshahi, Laguna Niguel, CA (US)

(73) Assignee: BIOMETRIC LINGERIE, INC.

( * ) Notice: Subject to any disclaimer, the term of this patent is extended or adjusted under 35 U.S.C. 154(b) by 65 days.

(21) Appl. No.: 15/384,136

(22) Filed: Dec. 19, 2016

(65) Prior Publication Data

US 2017/0095025 A1    Apr. 6, 2017

Related U.S. Application Data

(63) Continuation-in-part of application No. 13/850,938, filed on Mar. 26, 2013, now abandoned, which is a
(Continued)

(51) Int. Cl.
*A41F 1/00* (2006.01)
*A41F 9/00* (2006.01)
(Continued)

(52) U.S. Cl.
CPC .............. *A41F 1/002* (2013.01); *A41B 9/008* (2013.01); *A41B 9/04* (2013.01); *A41B 9/08* (2013.01); *A41C 3/005* (2013.01); *A41D 1/002* (2013.01); *A41D 1/06* (2013.01); *A41D 1/22* (2013.01); *A41F 1/006* (2013.01); *A41F 9/002* (2013.01);
(Continued)

(58) Field of Classification Search
CPC .......... A41F 1/002; A41F 1/006; A41F 9/002; A41C 3/005; G10L 17/24; A41D 1/22; A41D 1/002; A41D 1/06; A41B 9/04; A41B 9/08; A41B 9/008; Y10T 29/49815; Y10T 24/32
See application file for complete search history.

(56) References Cited

U.S. PATENT DOCUMENTS 4,878,879 A    11/1989  Kunstadter
5,050,595 A *  9/1991  Krafft ................... A61F 7/007
                                                          450/38
(Continued)

OTHER PUBLICATIONS

NBC Today Show http://www.nbc.com/news-sports/today-show/2011/07/klg-hoda-try-on-bras-for-jay-leno/.
(Continued)

*Primary Examiner* — Ramesh B Patel
(74) *Attorney, Agent, or Firm* — Michael M. Ahmadshahi

(57) ABSTRACT

A lingerie comprises an upper panel, a lower panel, and a signal-activated fastener. The upper panel is generally oriented horizontally and the lower panel is generally oriented vertically with respect to a wearer's body. The upper panel includes a first strap and a second strap and the lower panel includes one or more frontal straps and a back strap. The signal-activated fastener is coupled with one end of the first strap and one end of the second strap, the first ends of the one or more frontal straps are coupled with the upper panel, one end of the back strap is coupled with one the first strap and second strap, and the signal-activated fastener is responsive to a signal and operative to unfasten causing the lingerie to fall off from the wearer's body.

20 Claims, 7 Drawing Sheets

Related U.S. Application Data continuation-in-part of application No. 13/744,985, filed on Jan. 18, 2013, now Pat. No. 8,738,156, which is a continuation of application No. 11/977,076, filed on Oct. 22, 2007, now abandoned.

(60) Provisional application No. 60/853,210, filed on Oct. 20, 2006.

(51) Int. Cl.
| | |
|---|---|
| *A41C 3/00* | (2006.01) |
| *G10L 17/24* | (2013.01) |
| *A41B 9/08* | (2006.01) |
| *A41D 1/22* | (2018.01) |
| *A41B 9/04* | (2006.01) |
| *A41D 1/06* | (2006.01) |
| *A41D 1/00* | (2018.01) |
| *A41B 9/00* | (2006.01) |

(52) U.S. Cl.
CPC ............ *G10L 17/24* (2013.01); *Y10T 24/32* (2015.01); *Y10T 29/49815* (2015.01)

(56) References Cited

U.S. PATENT DOCUMENTS

| | | | | |
|---|---|---|---|---|
| 5,105,067 A * | 4/1992 | Brekkestran | ....... | G05D 23/2401 2/69 |
| 5,148,002 A * | 9/1992 | Kuo | ....... | H01Q 1/273 219/211 |
| 5,235,974 A * | 8/1993 | Miller | ....... | A61F 7/007 219/211 |
| 5,570,528 A | 11/1996 | Teetzel | | |
| 5,623,948 A * | 4/1997 | Van Morris | ....... | A61G 7/1015 5/81.1 R |
| 6,012,179 A * | 1/2000 | Garrett | ....... | A61F 7/10 2/456 |
| 6,147,611 A * | 11/2000 | Otero | ....... | G08B 5/002 340/573.1 |
| 6,198,204 B1 * | 3/2001 | Pottenger | ....... | A41C 3/0057 310/326 |
| 6,508,831 B1 * | 1/2003 | Kushnir | ....... | A61F 7/00 165/46 |
| 6,547,130 B1 | 4/2003 | Shen | | |
| 6,550,471 B2 * | 4/2003 | Szymocha | ....... | A41D 13/0051 126/204 |
| 6,738,671 B2 * | 5/2004 | Christophersom | ....... | A61N 1/37282 128/903 |
| 6,742,683 B1 | 6/2004 | Phan | | |
| 6,888,457 B2 * | 5/2005 | Wilkinson | ....... | A61B 5/0002 340/323 R |
| 6,954,133 B2 | 10/2005 | McGregor et al. | | |
| 7,023,320 B2 * | 4/2006 | Dvorak | ....... | G06F 1/163 340/5.53 |
| 7,173,437 B2 * | 2/2007 | Hervieux | ....... | A41D 13/1281 324/663 |
| 2002/0042937 A1 * | 4/2002 | Green | ....... | A41F 1/00 2/69 |
| 2003/0166375 A1 | 9/2003 | Noel et al. | | |
| 2003/0173408 A1 * | 9/2003 | Mosher, Jr. | ....... | A61B 5/117 235/492 |
| 2005/0010096 A1 | 1/2005 | Blackadar | | |
| 2005/0223479 A1 * | 10/2005 | Griffits | ....... | A41F 1/00 2/1 |
| 2005/0275542 A1 * | 12/2005 | Weekes | ....... | G08B 21/0286 340/573.1 |
| 2006/0099884 A1 * | 5/2006 | Falla | ....... | A41B 17/00 450/1 |
| 2007/0199137 A1 * | 8/2007 | Numes Ramos De Carvalho ...... A41D 1/002 2/458 |
| 2008/0000477 A1 * | 1/2008 | Huster | ....... | A61M 16/024 128/204.23 |
| 2008/0092341 A1 * | 4/2008 | Ahmadshahi | ....... | A41F 1/00 24/1 |
| 2008/0285388 A1 * | 11/2008 | Ohguri | ....... | G08C 23/02 367/198 |
| 2011/0225697 A1 * | 9/2011 | Griffits | ....... | H04N 5/4403 2/69 |
| 2013/0267850 A1 * | 10/2013 | Berman | ....... | A61B 8/0825 600/443 |
| 2013/0331755 A1 * | 12/2013 | Rotblatt | ....... | A61F 5/028 602/19 |
| 2014/0194961 A1 * | 7/2014 | Evans, Jr. | ....... | A61F 7/106 607/112 |

OTHER PUBLICATIONS

NBC Today Show http://www.today.com/id/26184891/vp/41949909#41949909.
YouTube Video http://www.youtube.com/watch?v=OgJvHePlEdU&oref=http%3A%2F%2Fwww.youtube.com%2Fwatch%3Fv%3DOgJvHePlEdU&has_verified=1.
Product Image http://www.google.com/imgres?imgurl=http://www.everseradio.com/wp-content/uploads/2010/07/Clap-Bra-8823.jpg&imgrefurl=http://www.instructables.com/id/Clap-Off-Bra/&h=322&w=300&sz=25&tbnid=Eu5QUPBwbvDdPM:&tbnh=90&tbnw=84&prev=/search%3Fq%3Dthe%2Bclap-off%2Bbra%2Bin%2Baction%26tbm%3Disch%26tbo%3Du&zoom=1&q=the+clap-off+bra+in.
Exhibit-A: Prosecution History of U.S. Appl. No. 11/977,076.

* cited by examiner

SIGNAL-ACTIVATED LINGERIE

CROSS REFERENCE TO RELATED APPLICATIONS

The present patent application is a continuation-in-part of a non-provisional patent application Ser. No. 13/850,938 filed Mar. 26, 2013, which is a continuation-in-part of a non-provisional patent application Ser. No. 13/744,985 filed Jan. 18, 2013 now patented on May 27, 2015 as U.S. Pat. No. 8,738,156, which is a continuation of a non-provisional patent application Ser. No. 11/977,076 filed Oct. 22, 2007 now abandoned, which claims benefit of a provisional patent application Ser. No. 60/853,210 filed Oct. 20, 2006 now expired. This patent application claims the benefit of the filing date of the cited non-provisional and provisional patent applications according to the statutes and rules governing provisional and non-provisional patent applications, particularly 35 USC §§ 119, 120, 121, and 37 CFR § 1.78. The specification and drawings of the cited provisional and non-provisional patent applications are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to garments comprising a signal-activated fastener. In particular, the present invention relates to a lingerie, including methods of operation, wherein the signal-activated fastener, inside a housing, receives a signal and unfastens causing the housing to decouple and wherein the weight of the housing due to gravity causes the lingerie to fall off from the wearer's body.

BACKGROUND

In the aforementioned patent applications, the lingerie did not cover the upper and lower portions of a wearer's body. Accordingly, a signal-activated lingerie is disclosed which has an upper and a lower panel that are coupled via straps and further via a signal-activated fastener.

Lingerie, such as bras which are worn by females, have a fastening mechanism, such as a hook-type fastener, which is difficult to open, especially for the male counterpart. A bra according to the present invention could be made using a signal-activated fastener such that the female's boyfriend or husband could clap his hand and the bra would automatically open.

The present state of the art in using authentication systems in variety of applications is well known to skilled artisans. In particular, voice or fingerprint authentication systems are routinely utilized in security applications. The present invention combines the existing technology of authentication with an article of clothing. Specifically, the present disclosure is a signal-activated bra which comprises a signal-activated fastener operative to unfasten the bra when said signal-activated fastener receives the clapping sound generated by a person clapping his/her hands.

The present invention disclosure further illustrates a signal-activated garment comprising a signal-activated fastener whereby the garment may be fastened or unfastened when a signal, received by the signal-activated fastener, substantially matches a predetermined signal. Various types of garments and voice-activated fasteners can be utilized. In one preferred embodiment, a brassiere comprises a signal-activated fastener whereby the brassiere may be fastened or unfastened when a biometric voice signal substantially matches a predetermined signal stored in the memory of a controller included in the signal-activated fastener. In another embodiment, an object, such as a communication device, may be secured/released to/from a signal-activated garment of the present invention.

SUMMARY

The present invention discloses a lingerie, including a method of operation, which comprises an upper panel, a lower panel, and a signal-activated fastener. Upon reception of a signal, the signal-activated fastener unfastens causing the lingerie to fall off from the wearer's body.

In one aspect, a lingerie is disclosed comprising an upper panel that is generally oriented horizontally with respect to a wearer's body, said upper panel including a first strap and a second strap, a lower panel that is generally oriented vertically with respect to the wearer's body, said lower panel including one or more frontal straps and a back strap, and a signal-activated fastener, wherein the signal-activated fastener is coupled with one end of the first strap and one end of the second strap, wherein the first ends of the one or more frontal straps are coupled with the upper panel, wherein one end of the back strap is coupled with one the first strap and second strap, and wherein the signal-activated fastener is responsive to a signal and operative to unfasten causing the lingerie to fall off from the wearer's body.

Preferably, at least one of the first strap, the second strap, the one or more frontal straps, and the back strap comprises elastic material, wherein by fastening the signal-activated fastener the elastic material in the at least one of the first strap, the second strap, the one or more frontal straps, and the back strap is stretched, and wherein by unfastening the signal-activated fastener, the strain energy associated with the stretched elastic material further causes the lingerie to fall off from the wearer's body.

Preferably, the signal-activated fastener comprises a latching component, a sensor operative to generate an electrical signal, a controller responsive to the electrical signal and operative to generate a control signal, and an actuator coupled with the latching component thereby fastening the lingerie, wherein the actuator is responsive to the control signal and operative to actuate thereby decoupling from the latching component.

Preferably, the sensor is capable of sensing at least one of a biometric signal, a sound pressure wave signal, a radio wave signal, an infrared wave signal, and a visible light wave signal.

Preferably, the controller generates the control signal upon verifying that the electrical signal comprises two consecutive pressure rise within a predetermined time interval.

Preferably, the controller generates the control signal upon verifying that the electrical signal comprises a single pressure rise including a predetermined amplitude.

Preferably, the controller generates the control signal upon verifying that the electrical signal substantially matches a predetermined signal. Preferably, the predetermined signal is at least one of a password, a phrase, and a combination thereof Preferably, the radio wave signal is one of a Bluetooth signal and a WI-FI signal.

Preferably, the sensor is a microphone.

In another aspect, a method for unfastening a lingerie is disclosed. The lingerie comprises an upper panel that is generally oriented horizontally with respect to a wearer's body, said upper panel including a first strap and a second strap, a lower panel that is generally oriented vertically with respect to the wearer's body, said lower panel including one or more frontal straps and a back strap, and a signal-activated fastener, wherein the signal-activated fastener is coupled with one end of the first strap and one end of the second strap, wherein the first ends of the one or more frontal straps are coupled with the upper panel, wherein one end of the back strap is coupled with one the first strap and second strap, the method comprises responding to a signal via the signal-activated fastener and unfastening the signal-activated fastener causing the lingerie to fall off from the wearer's body.

Figure 8A:
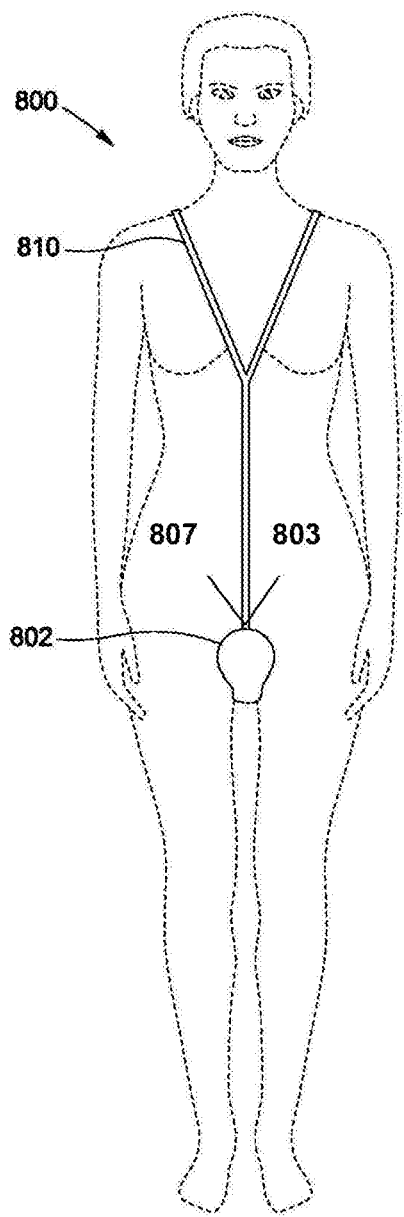
Figure 8B:
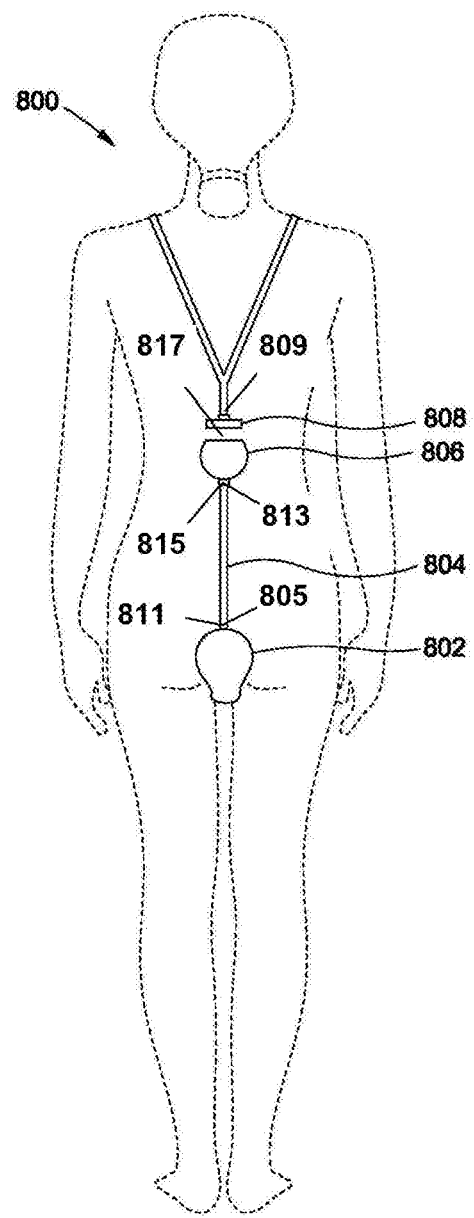

FIG, 8, consisting of FIG. 8A and FIG. 8B, shows a preferred embodiment of a lingerie, front and back views, worn by a person according to the present invention.

Figures 9, 10:
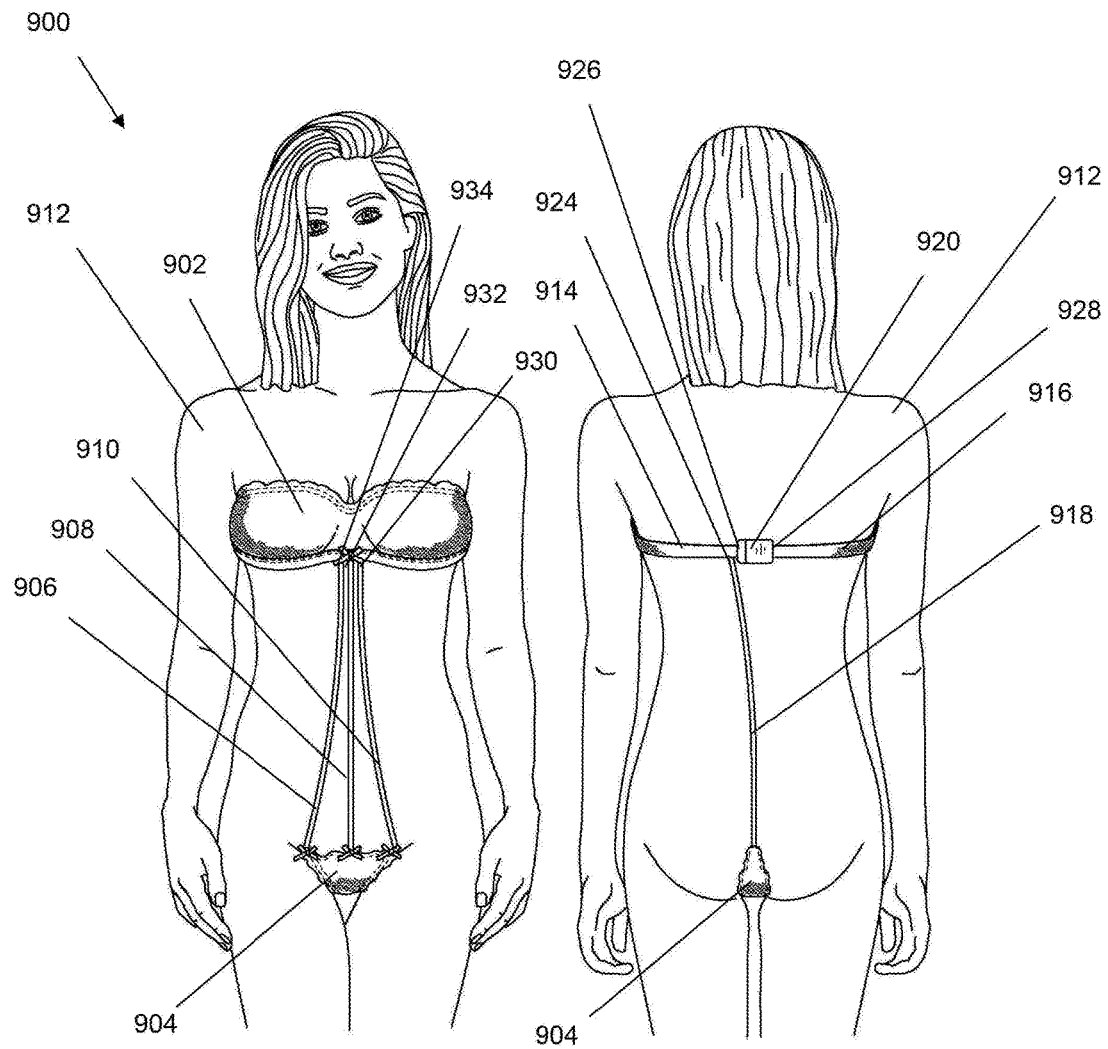

FIG. 9 shows a front view of a preferred embodiment of a lingerie worn by a person according to the present invention.

FIG, 10 shows a back view of the lingerie in FIG. 9.

Figure 11:
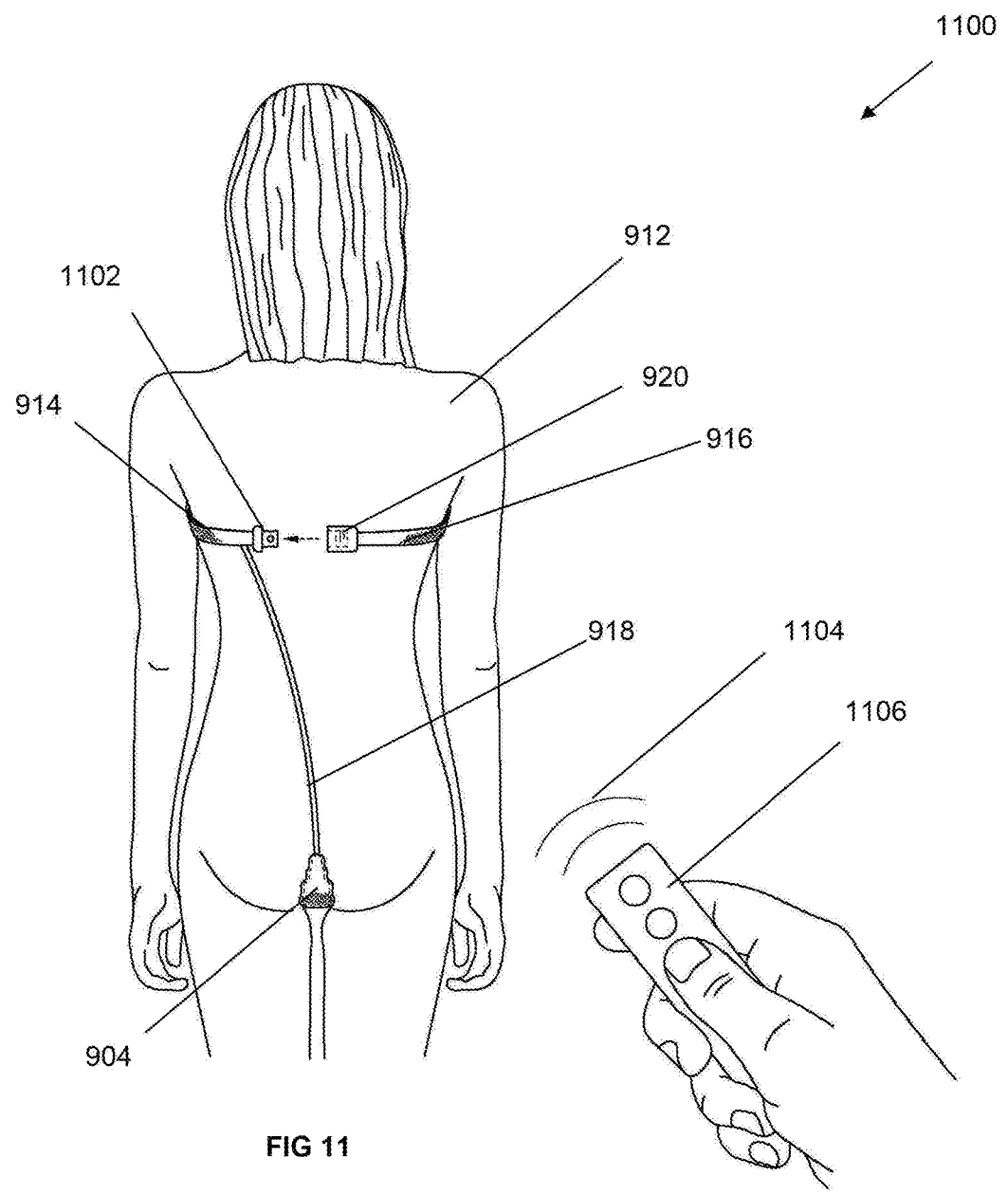

FIG. 11 shows the lingerie in FIG. 10 after the signal activated fastener is unfastened in response to radio waves.

DETAILED DESCRIPTION OF THE PRESENTLY PREFERRED EMBODIMENTS

Figure 1:
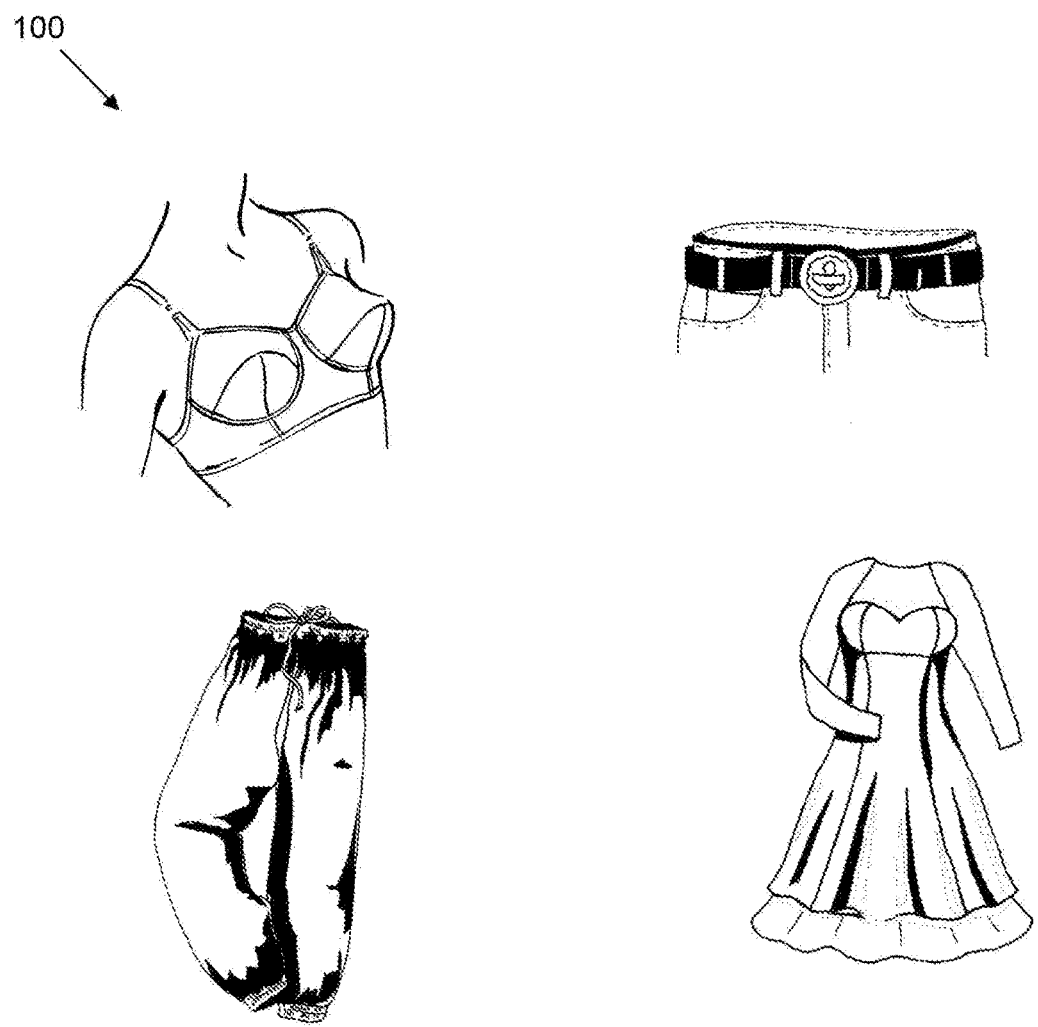
FIG. 1 shows various garments 100 that may be fastened/unfastened via a signal-activated fastener according to the present invention.

FIG. 1 shows various garments 100 that may be fastened/unfastened via a signal-activated fastener. According to the present invention, a brassiere, a belt, trousers, and a dress may be equipped with a signal-activated fastener so that they may be fastened or unfastened when a controller, included in the signal-activated fastener, ascertains a match between a received signal and a predetermined signal stored in the memory of the controller. In another embodiment of the present invention, an object, such as a weapon, communication device, article of clothing, may be secured/released to/from the garment via the signal-activated fastener.

The present invention utilizes the presently known authentication technology to arrive at a garment that maybe controllably fastened or unfastened. Voice and fingerprint identifications are among the many authentication systems presently known to skilled artisans. Voice verification is conceptually similar to fingerprinting. It is common knowledge that each person's fingerprints have unique characteristics that can be used to distinguish one person from another. It has also been proven that each person can be identified by the unique features of his or her vocal characteristics and speaking patterns. Biometric voice verification is the process of comparing a voice sample with a stored digital voice model, or voice print, for the purpose of verifying identity. A voiceprint is a digital representation of some of the unique characteristics of an individual's voice, including physiological characteristics of the nasal passages and vocal chords, as well as the frequency, cadence and duration of the vocal pattern.

In one instance, a brassiere comprises a signal-activated fastener that secures the brassiere on a woman's body. A general construction of the signal-activated fastener may require a power source such as a battery, a locking/unlocking device (fastener) such as an actuator, a sensor such as a biometric sensor, and a controller coupled with the sensor and the locking/unlocking device and including a microprocessor with all the required peripherals including software, known to skilled artisan, wherein said controller is responsive to the signal generated by the sensor and operative to apply a signal to the locking/unlocking device, upon recognition of the biometric quantity, i.e., one or more intrinsic physical or behavioural traits, to close/open the brassiere.

Figure 2:
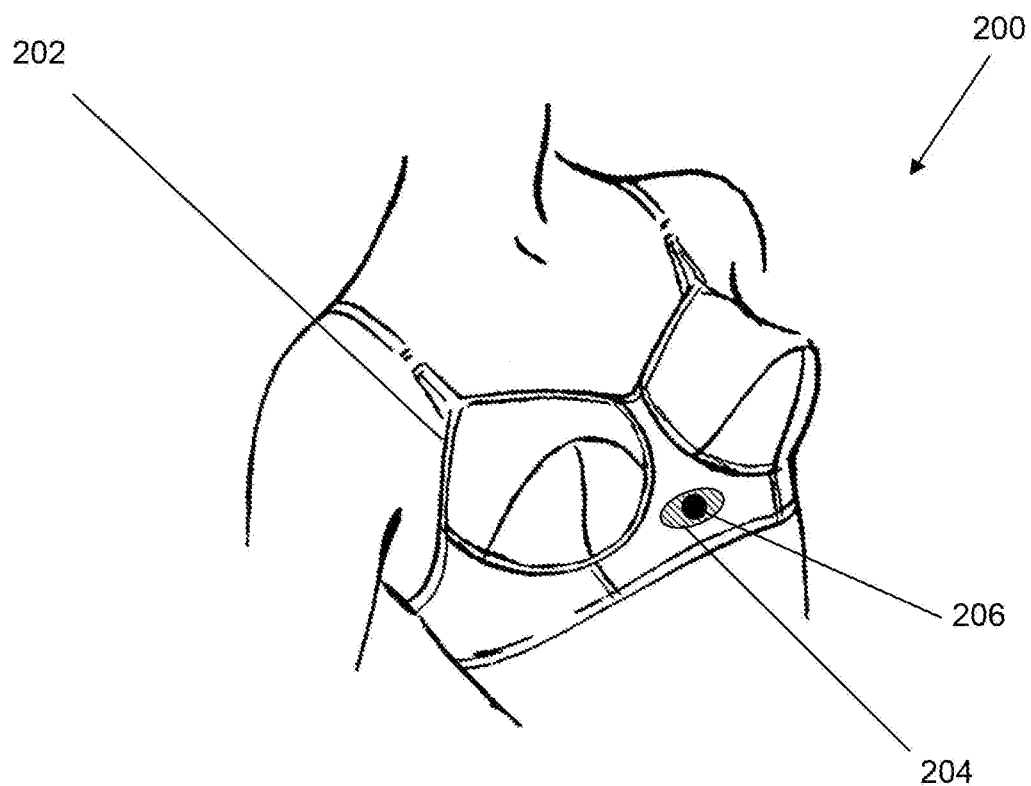
FIG. 2 shows a preferred embodiment of a signal-activated brassiere 200 comprising a signal-activated fastener.
Figure 2:
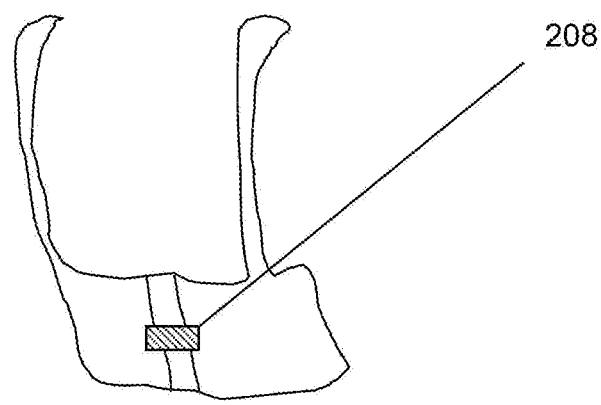

FIG. 2 shows a preferred embodiment of a clap-off bra 200 comprising a clap-off-activated fastener. The bra 202 comprises a clap-off-activated fastener which includes a controller 204, a sensor 206, and a fastener 208. According to one preferred embodiment, the controller 204 comprises a battery as its power source and a microprocessor to process the signal received by the sensor 206. Preferably, the sensor 206 is a microphone which generates an electrical signal when it senses pressure waves generated by the clapping sound. The controller 204 receives the electrical signal, processes the signal, and verifies that the signal comprises two consecutive claps within a predetermined time interval. The controller 204 then generates a control signal, operative on the fastener 208, to unfasten the bra 202. In another instance, the controller 204 receives the electrical signal, processes the signal, and verifies that the signal comprises a single clap having a predetermined amplitude, i.e., decibel level.

In one instance, an individual, wearing the signal-activated bra 200, manually fastens the bra 202 via the fastener 208. The sensor 206 receives sound waves that are generated by another individual clapping his/her hands. The controller 204 processes the signal and unfastens the bra 202 when it determines that there are two consecutive claps within a predetermined time interval.

In another embodiment, the signal-activated brassier 200 comprises a voice-activated fastener. The brassier 202 comprises a voice-activated fastener which includes a controller 204, a sensor 206, and a fastener 208. According to one preferred embodiment, the controller 204 comprises a battery as its power source and a microprocessor to process the signal received by the sensor 206. Preferably, the sensor 206 comprises a biometric sensor, such a biometric voice sensor. The controller 204 receives a voice signal via the biometric voice sensor 206, processes the signal, and compares the signal with a predetermined signal. If there is a substantial match between the two signals, the controller 204 generates a control signal, operative on the fastener 208, to controllably fasten/unfasten the brassiere 202.

In one instance, an individual, wearing the signal-activated brassiere 200, manually fastens the brassiere 202 via the fastener 208. The sensor 206 receives a voice signal, generated by another individual, and the controller 204 processes the signal and unfastens the brassiere 202 when a match is found. Accordingly, the brassiere 202 may only be automatically unfastened upon verification of the voice of the other individual. In another embodiment, the controller 204 verifies the voice signal when the other individual provides the correct password and then applies a control signal to the fastener 208 to fasten/unfasten the garment.

In another embodiment, the sensor 206 comprises a biometric sensor, such as a biometric fingerprint sensor. The controller 204 receives a fingerprint signal via the biometric fingerprint sensor 206, processes the signal, and compares the signal with a predetermined signal. If there is a substantial match between the two signals, the controller 204 generates a control signal, operative on the fastener 208, to controllably fasten/unfasten the brassiere 202.

In one instance, an individual, wearing the signal-activated brassiere 200, manually fastens the brassiere 202 via the fastener 208. The sensor 206 receives a fingerprint signal, generated by another individual, and the controller 204 processes the signal and unfastens the brassiere 202 when a match is found. Accordingly, the brassiere 202 may only be automatically unfastened upon verification of the fingerprint of the other individual.

Figure 3:
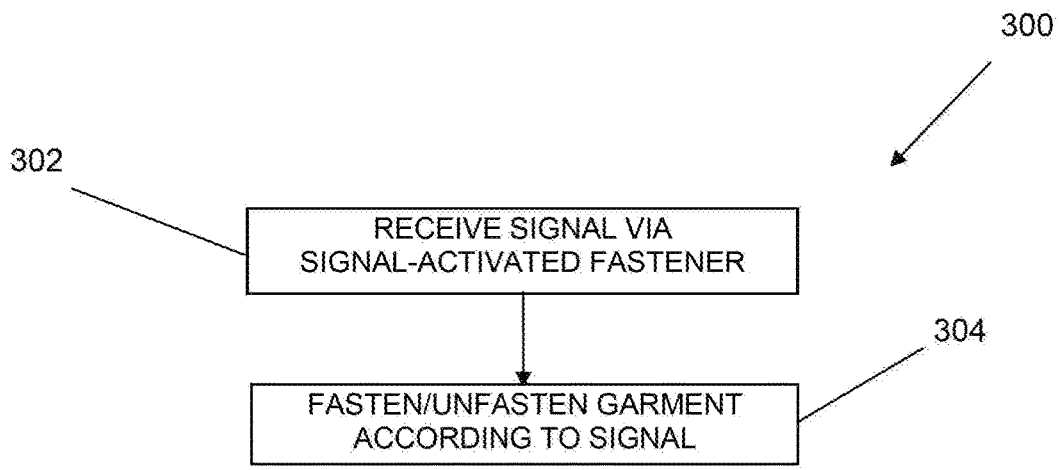
FIG. 3 shows a preferred method of fastening/unfastening a garment via a signal-activated fastener according to the present invention.

FIG. 3 shows a flow diagram 300 of one method of fastening/unfastening a garment according to the present invention. The preferred method comprises receiving a signal, such as a biometric signal, pressure signal, optical signal, via a signal-activated fastener at 302, and at least one of fastening and unfastening the garment according to the signal at 304.

Figure 4:
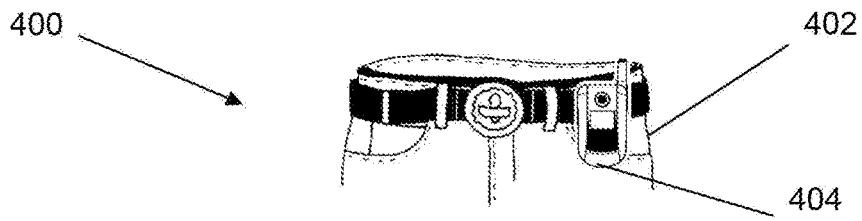
FIG. 4 shows a preferred embodiment of a signal-activated garment 400 comprising a voice activated fastener operable to secure/release an object to the garment FIG, 5 shows a preferred method of fastening/unfastening an object to a garment via a signal-activated fastener according to the present invention.

FIG. 4 shows a preferred embodiment 400 of a signal-activated garment 402 comprising a voice activated fastener. According to this embodiment, an object, such as a cell phone 404, may be secured/released to/from the signal-activated garment 402 via a signal activated fastener, such as a voice-activated fastener which includes a controller, such as the controller 204, a sensor, such as the sensor 206, and a fastener, such as the fastener 208. According to one preferred embodiment, the controller 204 comprises a battery as its power source and a microprocessor to process the signal received by the sensor 206. Preferably, the sensor 206 comprises a biometric sensor, such a biometric voice sensor. The controller 204 receives a voice signal via the biometric voice sensor 206, processes the signal, and compares the signal with a predetermined signal. If there is a substantial match between the two signals, the controller 204 generates a control signal, operative on the fastener 208, to controllably fasten/unfasten the cell phone 404 to the signal-activated garment 402.

In one instance, an individual, wearing the signal-activated garment 402, manually fastens the cell phone 404 via the fastener 208. The sensor 206 receives a voice signal, generated by the individual, and the controller 204 processes the signal and unfastens the cell phone 404 when a match is found. Accordingly, the cell phone 404 may only be automatically unfastened upon verification of the voice of the individual. In another embodiment, the controller 204 verifies the voice signal when the individual provides the correct password and then applies a control signal to the fastener 208 to fasten/unfasten the cell phone 404.

In another embodiment, the sensor 206 comprises a biometric sensor, such as a biometric fingerprint sensor The controller 204 receives a fingerprint signal via the biometric fingerprint sensor 206, processes the signal, and compares the signal with a predetermined signal. If there is a substantial match between the two signals, the controller 204 generates a control signal, operative on the fastener 208, to controllably secure/release the cell phone 404 to/from the signal-activated garment 402.

In one instance, an individual, wearing the signal-activated garment 402, manually fastens the cell phone 404 via the fastener 208. The sensor 206 receives a fingerprint signal, generated by the individual, and the controller 204 processes the signal and unfastens the cell phone 404 when a match is found. Accordingly, the cell phone 404 may only be automatically unfastened upon verification of the fingerprint of the individual.

Figure 5:
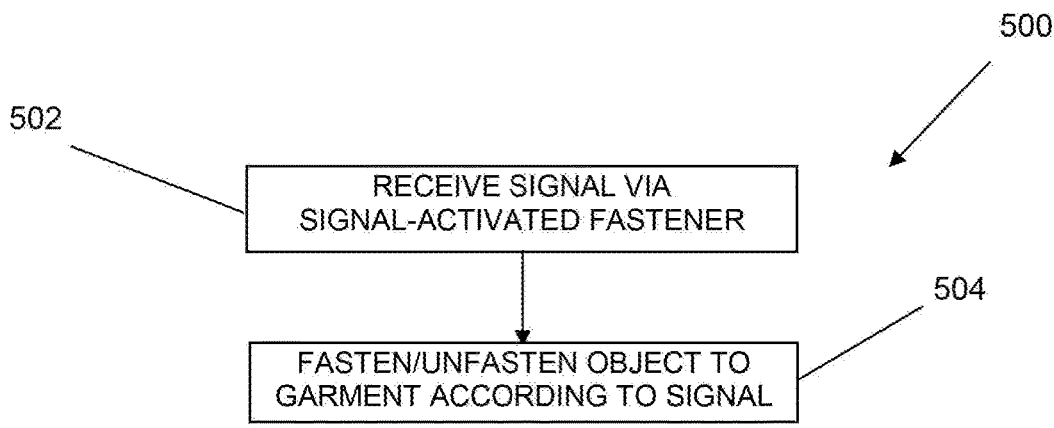

FIG. 5 shows a flow diagram 500 of one method of fastening/unfastening an object to a signal-activated garment of the present invention. The preferred method comprises receiving a signal, such as a biometric signal, pressure signal, optical signal, via a signal-activated fastener at 502, and at least one of fastening and unfastening the object to the signal-activated garment according to the signal at 304.

Figure 6:
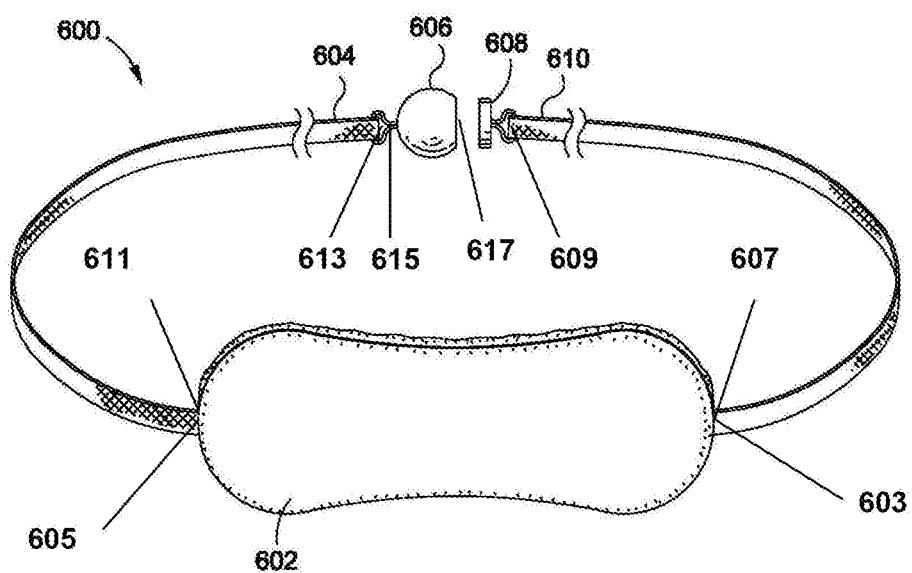
FIG. 6 shows a preferred embodiment of a lingerie comprising a panel, a first and second straps, and a signal-activated fastener inside a housing according to the present invention.

FIG. 6 shows a preferred embodiment of a signal-activated panties 600 comprising a signal-activated fastener. The signal-activated panties 600 comprises a panel 602 which includes a first panel-end 603 and second panel-end 605. The signal-activated panties 600 further comprises a first strap 610 which includes a first first-strap-end 607 and a second first-strap-end 609, wherein the first first-strap-end 607 is coupled with the first panel-end 603, preferably stitched and wherein the second first-strap-end 609 comprises a ferrous component 608. The signal-activated panties 600 further comprises a second strap 604 which includes a first second-strap-end 611 and a second second-strap-end 613, wherein the first second-strap-end 611 is coupled with the second panel-end 605, preferably stitched.

The signal-activated panties 600 further comprises a housing 606 that houses a signal-activated fastener (see FIG. 7) which includes a first housing-end 617 and a second housing-end 615, wherein the first housing-end 617 is coupled with the ferrous component 608 of the second first-strap-end 609, and the second housing-end 615 is coupled with the second second-strap-end 613. In a preferred embodiment the signal-activated fastener comprises an electromagnet which is magnetically couples the first housing-end 617 to the ferrous component 608 of the second first-strap-end 609. The signal-activated fastener is responsive to a signal, for instance two consecutive claps within a predetermined time interval, and operative to unfasten causing the housing 606 to magnetically decouple from the ferrous component 608 of the second first-strap-end 609 and wherein the weight of the housing 606, which includes the signal-activated fastener (see FIG. 7), due to gravity causes the signal-activated panties 600 to fall off from the wearer's body. In another preferred embodiment, at least one of the first and second straps, 610 and 604, comprises elastic material, wherein by coupling the first housing-end 617 of the housing 606 with the ferrous component 608 of the second first-strap-end 609, the elastic material is stretched, and by unfastening the signal-activated fastener, the strain energy associated with the stretched elastic material further causes the signal-activated panties 600 to fall off from the wearer's body.

Figure 7:
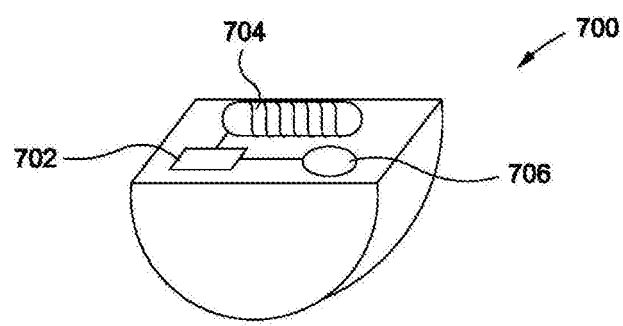
FIG. 7 shows a preferred embodiment of the inside of the housing where the signal-activated fastener includes a controller, a sensor, and an electromagnet according to the present invention.

FIG. 7 shows a preferred embodiment of the inside of a housing such as the housing 606 in FIG. 6, where the signal-activated fastener 700 includes a controller 702, a sensor 706, and an electromagnet 704, such as a solenoid known to artisans of ordinary skill. The controller 702 may be analog or digital such as a microprocessor and includes a rechargeable battery (not shown) as its power source, said battery may further be used to energize the electromagnet 704. The sensor 706 maybe a microphone which senses the pressure waves generated by a person clapping his/her hands.

The controller 702 receives the electrical signal, processes the signal, and verifies that the signal comprises two consecutive claps within a predetermined time interval. The controller 702 then generates a control signal, operative on the electromagnet 704 to de-energize (demagnetize) the electromagnet 704 causing the first housing end 617 to decouple from the ferrous component 608 of the second first-strap-end 609. The weight of the housing 606, which includes the signal-activated fastener 700, causes the signal-activated panties 600 to fall off from the wearer's body.

FIG. 8 shows a preferred embodiment of an individual wearing a signal-activated panties 800 according to the present invention. In particular, FIG. 8A shows the front side of the wearer and FIG. 8B shows the back side of the wearer. The signal-activated panties 800 comprises a panel 802 which includes a first panel-end 803 and second panel-end 805. The signal-activated panties 800 further comprises a first strap 810 which includes a first first-strap-end 807 and a second first-strap-end 809, wherein the first first-strap-end 807 is coupled with the first panel-end 8603, preferably stitched and wherein the second first-strap-end 809 comprises a ferrous component 808. The signal-activated panties 800 further comprises a second strap 804 which includes a first second-strap-end 811 and a second second-strap-end 813, wherein the first second-strap-end 811 is coupled with the second panel-end 805, preferably stitched.

The signal-activated panties 800 further comprises a housing 806 that houses a signal-activated fastener (see FIG. 7) which includes a first housing-end 817 and a second housing-end 815, wherein the first housing-end 817 is coupled with the ferrous component 808 of the second first-strap-end 809, and the second housing-end 815 is coupled with the second second-strap-end 813. In a preferred embodiment the signal-activated fastener comprises an electromagnet which magnetically couples the first housing-end 817 with the ferrous component 808 of the second first-strap-end 809. The controller 702 of the signal-activated fastener 700 is responsive to a signal, for instance two consecutive claps within a predetermined time interval, and operative to unfasten causing the housing 806 to magnetically decouple from the ferrous component 808 of the second first-strap-end 809 and wherein the weight of the housing 806, which includes the signal-activated fastener (see FIG. 7), due to gravity causes the signal-activated panties 800 to fall off from the wearer's body.

In one instance, an individual wearing the signal-activated panties 800 manually fastens the signal-activated panties 800 by magnetizing (energizing) the electromagnet 704 causing the first housing-end 817 to couple with the ferrous component 808 of the second first-strap-end 809. The sensor 706 receives sound waves that are generated by another individual clapping his/her hands The controller 702 processes the signal and generates a control signal that unfastens the signal-activated fastener 700 by demagnetizing (de-energizing) the electromagnet 704 when it determines that there are two consecutive claps, roughly 250 milliseconds apart, within a predetermined time interval, approximately 1 second.

In another embodiment, the sensor 706 of the signal-activated fastener 700 is a biometric voice sensor. The controller 702 of the signal-activated fastener 700 receives a voice signal via the biometric voice sensor 706, processes the signal, and compares the signal with a predetermined signal. If there is a substantial match between the two signals, the controller 706 generates a control signal, operative on the electromagnet 704 causing the housing 806 to magnetically decouple from the ferrous component 808 of the second first-strap-end 809. The weight of the housing 806, which includes the signal-activated fastener (see FIG, 7), due to gravity causes the signal-activated panties 800 to fall off from the wearer's body.

In one instance, an individual wearing the signal-activated panties 800 manually fastens the signal-activated panties 800 by magnetizing (energizing) the electromagnet 704 causing the first housing-end 817 to couple with the ferrous component 808 of the second first-strap-end 809. The biometric voice sensor 706 receives a voice signal, generated by another individual, and the controller 702 processes the signal and generates a control signal that unfastens the signal-activated fastener 700 by demagnetizing (de-energizing) the electromagnet 704 when a match is found. Accordingly, the signal-activated panties 800 may only be automatically unfastened upon verification of the voice of the other individual. In another embodiment, the controller 702 verifies the voice signal when the other individual provides the correct password and then applies a control signal to the electromagnet 704.

In another embodiment, the sensor 706 of the signal-activated fastener 700 is a biometric fingerprint sensor. The controller 702 of the signal-activated fastener 700 receives a fingerprint signal via the biometric fingerprint sensor 706, processes the signal, and compares the signal with a predetermined signal. If there is a substantial match between the two signals, the controller 706 generates a control signal, operative on the electromagnet 704 causing the housing 806 to magnetically decouple from the ferrous component 808 of the second first-strap-end 809. The weight of the housing 806, which includes the signal-activated fastener (see FIG. 7), due to gravity causes the signal-activated panties 800 to fall off from the wearer's body.

In one instance, an individual wearing the signal-activated panties 800 manually fastens the signal-activated panties 800 by magnetizing (energizing) the electromagnet 704 causing the first housing-end 817 to couple with the ferrous component 808 of the second first-strap-end 809. The biometric fingerprint sensor 706 receives a fingerprint signal, generated by another individual, and the controller 702 processes the signal and generates a control signal that unfastens the signal-activated fastener 700 by demagnetizing (de-energizing) the electromagnet 704 when a match is found. Accordingly, the signal-activated panties 800 may only be automatically unfastened upon verification of the fingerprint of the other individual.

FIGS. 9 and 10 show the front and back views of a preferred embodiment of a signal-activated lingerie 900. The signal-activated lingerie 900 comprises an upper panel 902 which is generally oriented horizontally with respect to a wearer's body 912. The upper panel 902 covers generally the upper portion of the wearer's torso. The signal-activated lingerie 900 further comprises a lower panel 904 which is generally oriented vertically with respect to the wearer's body 912. The lower panel 904 covers generally the lower portion of the wearer's torso. The upper panel 902 includes a first strap 914 and a second strap 916. The lower panel 904 includes three frontal straps 906, 908, and 910, and a back strap 918. The signal-activated lingerie 900 further comprises a signal-activated fastener 920 which is coupled with one end 926 of the first strap 914 and one end 928 of the second strap 916. The first ends 930, 932, and 934 of the three frontal straps 910, 908. and 906 are coupled with the upper panel 902. One end 924 of the back strap 918 is coupled with the first strap 914.

FIG. 11 shows the lingerie in FIG. 10 after the signal-activated fastener 920 is unfastened in response to radio waves 1104. The signal-activated fastener 920 includes a latching component 1102 which unlatches when the sensor (not shown) receives the radio waves 1104, generating an electrical signal to the controller (not shown) of the signal-activated fastener 920.

In one instance, an individual wearing the signal-activated lingerie 900, manually fastens the signal-activated fastener 920 and energizes the actuator (not shown) of the signal-activated fastener 920. Another individual having a device 1106, such as a smartphone, generates a Bluetooth signal, such as the radio wave 1104, which contains a password. The sensor (not shown) of the signal-activated fastener 920 receives the radio wave signal 1104 and generates an electrical signal to the controller (not shown) of the signal-activated fastener 920. The controller processes the signal and generates a control signal that unfastens the signal-activated fastener 920 when the password is verified.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A lingerie comprising:
   (a) an upper panel that is generally oriented horizontally with respect to a wearer's body, said upper panel including a first strap and a second strap;
   (b) a lower panel that is generally oriented vertically with respect to the wearer's body, said lower panel including one or more frontal straps and a back strap; and
   (c) a signal-activated fastener;
   wherein the signal-activated fastener is coupled with one end of the first strap and one end of the second strap, wherein the first ends of the one or more frontal straps are coupled with the upper panel, wherein one end of the back strap is coupled with one the first strap and second strap, and wherein the signal-activated fastener is responsive to a signal and operative to unfasten causing the lingerie to fall off from the wearer's body.

2. The lingerie of claim 1, wherein at least one of the first strap, the second strap, the one or more frontal straps, and the back strap comprises elastic material, wherein by fastening the signal-activated fastener the elastic material in the at least one of the first strap, the second strap, the one or more frontal straps, and the back strap is stretched, and wherein by unfastening the signal-activated fastener, the strain energy associated with the stretched elastic material further causes the lingerie to fall off from the wearer's body.

3. The lingerie of claim 1, wherein the signal-activated fastener comprises:
   (a) a latching component;
   (b) a sensor operative to generate an electrical signal;
   (c) a controller responsive to the electrical signal and operative to generate a control signal; and
   (d) an actuator coupled with the latching component thereby fastening the lingerie;
   wherein the actuator is responsive to the control signal and operative to actuate thereby decoupling from the latching component.

4. The lingerie of claim 3, wherein the sensor is capable of sensing at least one of a biometric signal, a sound pressure wave signal, a radio wave signal, an infrared wave signal, and a visible light wave signal.

5. The lingerie of claim 4, wherein the controller generates the control signal upon verifying that the electrical signal comprises two consecutive pressure rise within a predetermined time interval.

6. The lingerie of claim 4, wherein the controller generates the control signal upon verifying that the electrical signal comprises a single pressure rise including a predetermined amplitude.

7. The lingerie of claim 4, wherein the controller generates the control signal upon verifying that the electrical signal substantially matches a predetermined signal.

8. The lingerie of claim 7, wherein the predetermined signal is at least one of a password, a phrase, and a combination thereof.

9. The lingerie of claim 4, wherein the radio wave signal is one of a Bluetooth signal and a WI-FI.

10. The lingerie of claim 4, wherein the sensor is a microphone.

11. A method for unfastening a lingerie, said lingerie comprising:
    (a) an upper panel that is generally oriented horizontally with respect to a wearer's body, said upper panel including a first strap and a second strap;
    (b) a lower panel that is generally oriented vertically with respect to the wearer's body, said lower panel including one or more frontal straps and a back strap; and
    (c) a signal-activated fastener;
    wherein the signal-activated fastener is coupled with one end of the first strap and one end of the second strap, wherein the first ends of the one or more frontal straps are coupled with the upper panel, wherein one end of the back strap is coupled with one the first strap and second strap;
    said method comprising:
    (i) responding to a signal via the signal-activated fastener; and
    (ii) unfastening the signal-activated fastener causing the lingerie to fall off from the wearer's body.

12. The method of claim 11, wherein at least one of the first strap, the second strap, the one or more frontal straps, and the back strap comprises elastic material, wherein by fastening the signal-activated fastener the elastic material in the at least one of the first strap, the second strap, the one or more frontal straps, and the back strap is stretched, and wherein by unfastening the signal-activated fastener, the strain energy associated with the stretched elastic material further causes the lingerie to fall off from the wearer's body.

13. The method of claim 11, wherein the signal-activated fastener comprises:
    (a) a latching component;
    (b) a sensor operative to generate an electrical signal;

(c) a controller responsive to the electrical signal and operative to generate a control signal; and (d) an actuator coupled with the latching component thereby fastening the lingerie;

wherein the actuator is responsive to the control signal and operative to actuate thereby decoupling from the latching component.

14. The method of claim 13, wherein the sensor is capable of sensing at least one of a biometric signal, a sound pressure wave signal, a radio wave signal, an infrared wave signal, and a visible light wave signal.

15. The method of claim 14, wherein the controller generates the control signal upon verifying that the electrical signal comprises two consecutive pressure rise within a predetermined time interval.

16. The method of claim 14, wherein the controller generates the control signal upon verifying that the electrical signal comprises a single pressure rise including a predetermined amplitude.

17. The method of claim 14, wherein the controller generates the control signal upon verifying that the electrical signal substantially matches a predetermined signal.

18. The method of claim 17, wherein the predetermined signal is at least one of a password, a phrase, and a combination thereof.

19. The method of claim 14, wherein the radio wave signal is one of a Bluetooth signal and a WI-FI signal.

20. The method of claim 14, wherein the sensor is a microphone.

* * * * *